(12) United States Patent
Walton et al.

(10) Patent No.: US 12,071,337 B2
(45) Date of Patent: Aug. 27, 2024

(54) LIQUID DISPENSER FOR DISPENSING WATER AND A FLAVORED BEVERAGE

(71) Applicant: Cardomon International Limited, Kowlon (HK)

(72) Inventors: Philip A. Walton, Bishop Auckland (GB); Andrew Smith, Durham (GB); Dennis Laurier Rivard, Alberta (CA)

(73) Assignees: CRYSTAL MOUNTAIN INTERNATIONAL LIMITED, Hong Kong (HK); DS SERVICES OF AMERICA, INC., Atlanta, GA (US)

( * ) Notice: Subject to any disclaimer, the term of this patent is extended or adjusted under 35 U.S.C. 154(b) by 0 days.

(21) Appl. No.: 16/986,125

(22) Filed: Aug. 5, 2020

(65) Prior Publication Data

US 2020/0385258 A1 Dec. 10, 2020

Related U.S. Application Data

(62) Division of application No. 16/042,751, filed on Jul. 23, 2018, now Pat. No. 10,781,093.

(51) Int. Cl.
*B67D 1/10* (2006.01)
*B67D 1/00* (2006.01)
(Continued)

(52) U.S. Cl.
CPC ............ *B67D 7/84* (2013.01); *B67D 1/0078* (2013.01); *B67D 7/02* (2013.01); *B67D 7/82* (2013.01)

(58) Field of Classification Search
CPC ...... A47J 31/407; A47J 31/46; A47J 31/3695; A47J 31/3628; A47J 31/4482;
(Continued)

(56) References Cited

U.S. PATENT DOCUMENTS

| | | | | |
|---|---|---|---|---|
| 5,367,947 A | * | 11/1994 | Lussi | A47J 31/3609 99/287 |
| 6,036,053 A | * | 3/2000 | Simmons | B67D 1/0057 222/64 |

(Continued)

FOREIGN PATENT DOCUMENTS

| CN | 103781721 | 5/2014 |
|---|---|---|
| CN | 107205578 | 9/2017 |

(Continued)

OTHER PUBLICATIONS

Office Action dated Oct. 21, 2022 issued in Russian Patent Application No. 2021104349.

(Continued)

*Primary Examiner* — Charles P. Cheyney
(74) *Attorney, Agent, or Firm* — Merek, Blackmon & Voorhees, LLC

(57) ABSTRACT

A liquid dispensing apparatus for dispensing water and a flavored beverage. The dispensing apparatus may dispense chilled drinking water, hot drinking water and/or ambient temperature drinking water. The dispensing apparatus may further dispense a chilled, ambient temperature and/or hot flavored beverage. The flavored beverage may be coffee, tea, hot chocolate or another flavored beverage. The dispensing apparatus may include a replaceable five (5) gallon water bottle stored in a lower portion of the dispensing apparatus or an external source of water. Preferably, the liquid dispensing apparatus dispenses chilled drinking water and hot coffee from a replaceable five (5) gallon water bottle stored in a lower portion of the dispensing apparatus wherein the replaceable five (5) gallon water bottle is stored in an upright orientation, i.e., the discharge port of the replaceable five (5) gallon water bottle is oriented above a bottom of the replaceable five (5) gallon water bottle.

20 Claims, 21 Drawing Sheets

(51) Int. Cl.
  *B67D 7/02* (2010.01)
  *B67D 7/82* (2010.01)
  *B67D 7/84* (2010.01)

(58) Field of Classification Search
  CPC ....... A47J 31/4492; A47J 31/057; B67D 7/84; B67D 7/82; B67D 7/02; B67D 1/0078; B67D 1/0009; B67D 1/07; B67D 1/10
  USPC .............. 222/129.1, 146.6, 325; 99/295, 300
  See application file for complete search history.

(56) References Cited

U.S. PATENT DOCUMENTS

| | | | |
|---|---|---|---|
| 9,271,603 B2* | 3/2016 | Yui | A47J 31/3695 |
| 10,674,863 B2* | 6/2020 | Sevcik | A47J 31/401 |
| 2002/0130140 A1 | 9/2002 | Cote | |
| 2011/0094389 A1* | 4/2011 | Coccia | A47J 31/36 99/280 |
| 2013/0233180 A1* | 9/2013 | Belmont | B01F 23/2361 99/323.2 |
| 2014/0144928 A1* | 5/2014 | Dobbins | B67D 1/0031 222/142 |
| 2016/0058242 A1* | 3/2016 | Viet-Doan | B65D 81/02 99/283 |
| 2016/0150911 A1* | 6/2016 | Upston | A47J 31/3685 99/300 |
| 2017/0367524 A1 | 12/2017 | Graff et al. | |
| 2018/0206668 A1* | 7/2018 | Sahli | A47J 31/52 |
| 2019/0053656 A1 | 2/2019 | Locher | |
| 2020/0275798 A1* | 9/2020 | Te Velde | A47J 31/52 |
| 2020/0329900 A1* | 10/2020 | Dubief | A47J 31/401 |

FOREIGN PATENT DOCUMENTS

| | | |
|---|---|---|
| JP | 2016-530914 | 10/2016 |
| WO | WO2013030753 | 3/2013 |
| WO | WO2015/009580 | 1/2015 |

OTHER PUBLICATIONS

English translation of Office Action dated Oct. 21, 2022 issued in Russian Patent Application No. 2021104349.
International Search Report dated Feb. 3, 2020 issued in connection with International Application No. PCT/IB2019/056173, four (4) pages.
Chinese Office Action dated Jul. 27, 2022 issued in connection with corresponding Chinese Application No. 201980062123.9, eighteen (18) pages.
Office Action dated Mar. 5, 2023 issued in Chinese Patent Application No. 201980062123.9.
English translation of Office Action dated Mar. 5, 2023 issued in Chinese Patent Application No. 201980062123.9.
Office Action dated May 23, 2023 issued in corresponding Japanese Patent Application No. 2019-503839.
English translation of Office Action dated May 23, 2023 issued in corresponding Japanese Patent Application No. 2019-503839.

* cited by examiner

LIQUID DISPENSER FOR DISPENSING WATER AND A FLAVORED BEVERAGE

RELATED APPLICATION

The subject patent application is a divisional application of U.S. patent application Ser. No. 16/042,751 filed on Jul. 23, 2018 the entire contents of which are incorporated herein by reference.

FIELD OF THE INVENTION

The present invention is directed to a dispensing apparatus for dispensing water and a flavored beverage. The dispensing apparatus may dispense chilled drinking water, hot drinking water and/or ambient temperature drinking water. The dispensing apparatus may dispense a chilled, ambient temperature and/or hot flavored beverage. The flavored beverage may be coffee, tea, hot chocolate or another flavored beverage. The dispensing apparatus may include a replaceable five (5) gallon water bottle stored in a lower portion of a housing of the dispensing apparatus in an upright orientation, i.e., wherein the discharge port of the replaceable five (5) gallon water bottle is oriented above a bottom of the replaceable five (5) gallon water bottle. In its most preferred form, the present invention is directed to a liquid dispensing apparatus for dispensing chilled drinking water and hot coffee or another hot flavored beverage. However, in place of an internal water source (e.g., five (5) gallon water bottle) the dispensing apparatus can be connected to a water source external to the dispensing apparatus. For example, the dispensing apparatus could be connected to the water system of a building structure (e.g., house, office building, hotel, etc.). In this instance, the dispensing apparatus may be provided with a filter system located in an interior of the housing of the dispensing apparatus to ensure the quality of water dispensed from the dispensing apparatus.

BACKGROUND OF THE INVENTION

Existing water dispensers use gravity as the driving force to dispense water from the water dispenser. In this type of water dispenser, the water bottle is positioned above the dispensing location. These dispensers are referred to as "Top-Loading" water dispensers. Top-Loading water dispensers typically include means for receiving a five (5) gallon water bottle at the uppermost portion of the water dispenser. Five (5) gallon water bottles are quite heavy making it difficult for some individuals to mount the water bottle on the uppermost portion of the water cooler. Top-Loading water dispensers typically dispense water for human consumption. Therefore, it is important that the water contact surfaces of the water dispenser be periodically cleaned. The cleaning process is generally known as "sanitization." U.S. Pat. Nos. 5,361,942 and 5,439,145 disclose Top-Loading water dispensers designed to improve the sanitization process. Ebac Limited sells Top-Loading water dispensers designed to improve the sanitization process utilizing at least some of the features disclosed in U.S. Pat. Nos. 5,361,942 and 5,439,145 including the removable manifold unit, reservoir and associated plastic or rubber tubing. This removable assembly is marketed under the Ebac Limited trademark WATERTRAIL.

To overcome the problems of Top-Loading water dispensers, water dispensers in which the water bottle is stored in the lower portion of the water dispenser have been proposed. Since these systems cannot rely upon gravity to dispense drinking water, pumps are typically employed to pump the drinking water to the dispensing location located above the water bottle. These types of water dispensers are referred to herein as "Bottom-Loading" water dispensers. An example of such a water dispenser is disclosed in U.S. Patent Publication No. 2005/0072813. Bottom-Loading water dispensers address the water bottle installation problems associated with Top-Loading water dispensers. However, Bottom-Loading water dispensers employ significantly more water contact components than Top-Loading water dispensers and, therefore, are more difficult to sanitize effectively. Ebac Limited introduced a Bottom-Loading water dispenser under the trademark EASYLOADER with a removable WATERTRAIL in an effort to make sanitization easier. However, this water dispenser was expensive to produce and has not succeeded commercially.

The bottom-Loading liquid dispensers disclosed in U.S. Pat. Nos. 8,887,955 and 9,527,714 have a number of advantageous features including but not limited to the removable liquid transport assembly that can be readily and easily removed for cleaning or replacement. Both top-loading and bottom-loading liquid dispensers are designed to dispense water at various temperatures but are unable to also dispense a flavored beverage from the dispenser. One liquid dispenser previously marketed under the trademark AQUACAFE r was designed to dispense both water and coffee. However, this liquid dispenser has a number of inherent disadvantages including the inability to readily remove and clean and/or replace the coffee dispensing assembly and the water dispensing assembly.

Accordingly, there exists a need for an improved liquid dispenser that dispenses both water and one or more flavored beverages.

OBJECTS AND SUMMARY OF THE INVENTION

An object of the present invention is to provide a novel and unobvious liquid dispenser for dispensing water and a flavored beverage.

Another object of a preferred embodiment of the present invention is to provide a liquid dispenser with a flavored beverage dispensing assembly configured to allow a user to readily remove the flavored beverage dispensing assembly to clean or replace the flavored beverage dispensing assembly.

A further object of a preferred embodiment of the present invention is to provide a liquid dispenser with a flavored beverage dispensing assembly configured such that all parts of the flavored beverage dispensing assembly coming into contact with water and/or a flavored beverage are readily removable from a housing of the liquid dispenser to allow cleaning or replacement of the flavored beverage dispensing assembly.

Yet another object of a preferred embodiment of the present invention is to provide a liquid dispenser with a removable water dispensing assembly and a removable flavored beverage dispensing assembly configured to be readily removable from a housing of the liquid dispenser to allow cleaning or replacement of the flavored beverage dispensing assembly and the water dispensing assembly.

Yet a further object of a preferred embodiment of the present invention is to provide a liquid dispenser with a removable water dispensing assembly and a removable flavored beverage dispensing assembly wherein the removable flavored beverage dispensing assembly is connected to said removable water dispensing assembly to receive water from said removable water dispensing assembly.

Still another object of a preferred embodiment of the present invention is to provide a removable water dispensing assembly and flavored beverage dispensing assembly that are relatively inexpensive to manufacture while allowing for effective sanitization and/or replacement of the water dispensing assembly and the flavored beverage dispensing assembly.

A still further object of a preferred embodiment of the present invention is to provide a liquid dispenser with a water dispensing assembly, a flavored dispensing assembly, a single water pump and a control system and/or other features (e.g., a voltage reducer) configured to supply water to the flavored dispensing assembly at a lower pressure than water discharged from the liquid dispenser through the water dispensing assembly.

Yet still a further object of a preferred embodiment of the present invention is to provide a liquid dispenser with a main housing having a main housing cover moveable between an open position and a closed position, a water dispensing assembly, a removable flavored dispensing assembly having a cover moveable between an open position and closed position wherein when the main housing cover is in the open position the removable flavored dispensing assembly can be readily removed from the main housing and when the cover of the removable flavored dispensing assembly is in the open position and the main housing cover is in the closed position, a single serving flavored beverage pod can be readily removed or inserted into the removable flavored dispensing assembly but the removable flavored dispensing assembly cannot be removed from the main housing.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a liquid dispenser for dispensing water and a flavored beverage. The liquid dispenser includes a water dispensing assembly, a flavored beverage dispensing assembly and a main water storage container. The liquid dispenser further includes a main housing for storing at least a portion of the water dispensing assembly, at least a portion of the flavored beverage dispensing assembly and the main water storage container. The flavored beverage dispensing assembly has a pod receiving member for receiving a pod for dispensing a single-serving flavored beverage. The flavored beverage dispensing assembly is removable from the housing so that the flavored beverage dispensing assembly can be replaced or sanitized.

Another preferred embodiment of the present invention is directed to a liquid dispenser for dispensing water and a flavored beverage. The liquid dispenser includes a water dispensing assembly, a flavored beverage dispensing assembly and a water storage container. The liquid dispenser further includes a liquid dispenser housing for storing at least a portion of the water dispensing assembly, at least a portion of the flavored beverage dispensing assembly and the water storage container. The flavored beverage dispensing assembly is removable from the liquid dispenser housing so that the flavored beverage dispensing assembly can be replaced or sanitized. The water dispensing assembly is removable from the liquid dispenser housing so that the water dispensing assembly can be replaced or sanitized. The water dispensing assembly is connected to the water storage container to receive water from the water storage container. The flavored beverage dispensing assembly is connected to the water dispensing assembly to receive water from the water dispensing assembly.

A further preferred embodiment of the present invention is directed to a liquid dispenser for dispensing water and a flavored beverage. The liquid dispenser includes a water dispensing assembly, a flavored beverage dispensing assembly and a water storage container. The liquid dispenser further includes a liquid dispenser housing for storing at least a portion of the water dispensing assembly, at least a portion of the flavored beverage dispensing assembly and the water storage container. A single water pump for pumping water from the water storage container to the water dispensing assembly and the flavored beverage assembly. A control system is operably connected to the single water pump to supply water to the flavored beverage dispensing assembly at a lower pressure than water discharged from the liquid dispenser by the water dispensing assembly.

The above preferred forms of the present invention described above provide various examples of preferred embodiments of the present invention and are not to be construed as limiting the present invention to any of the preferred forms described above.

DETAILED DESCRIPTION OF THE PREFERRED EMBODIMENT OF THE INVENTION

The preferred form of the invention will now be described with reference to FIGS. 1-20. The appended claims are not limited to the preferred form and no term and/or phrase used herein is to be given a meaning other than its ordinary meaning unless it is expressly stated otherwise.

FIGS. 1 Through 20

Referring to FIGS. 1 to 20, a liquid dispenser A employing a preferred form of the invention is illustrated in one of many possible configurations. In the most preferred form, liquid dispenser A dispenses water and a flavored beverage for human consumption. The water and flavored beverage dispensed by liquid dispenser A may be chilled, ambient temperature and/or hot. The flavored beverages may include but are not limited to coffee, tea and/or hot chocolate.

Liquid dispenser A includes a main housing B having a substantially hollow internal cavity for housing components of the liquid dispenser, a liquid dispensing location C and a hollow liquid storage container section 1 (see FIG. 1A) formed in a bottom portion D of main housing B for receiving and storing a liquid storage container E in an upright orientation. One or more portion of the lower portion of main housing B may be removable or moveable (see, for example FIG. 1A, showing a lower front panel that can slide upwardly to allow access to liquid storage container E) to allow an individual to access, remove and replace liquid storage container E.

Liquid dispenser A further includes a cover F pivotally connected to a rear portion of main housing B. Any suitable latch mechanism may be used to permit the forward edge of the cover F to be secured to and released from a corresponding front edge of main housing B so that cover F can move between a closed, latched position shown in, for example, FIG. 1 and an open, unlatched position shown in, for example, FIG. 6.

The liquid storage container E is preferably a replaceable five (5) gallon water bottle oriented in an upright manner. However, it is to be understood that the source of water could be varied including but not limited to an inverted water source (e.g., inverted replaceable five (5) gallon water bottle) mounted on the top of main housing B or a water source external to main housing B.

Figure 1:
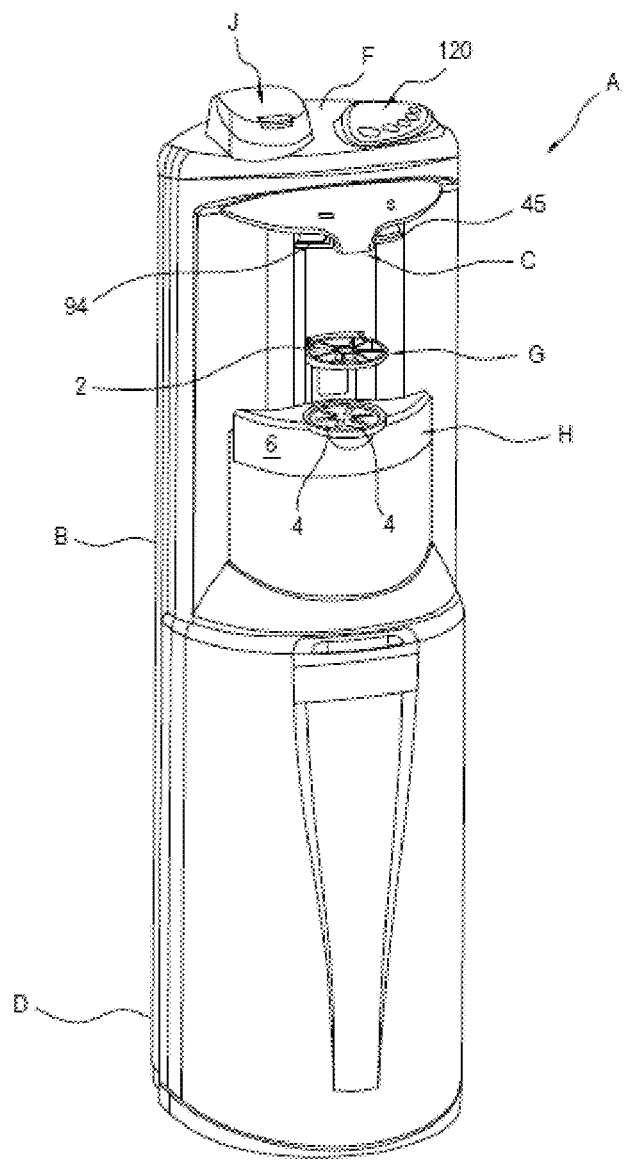
FIG. 1 is a perspective view of a liquid dispenser formed in accordance with a preferred embodiment of the present invention.
Figure 1A:
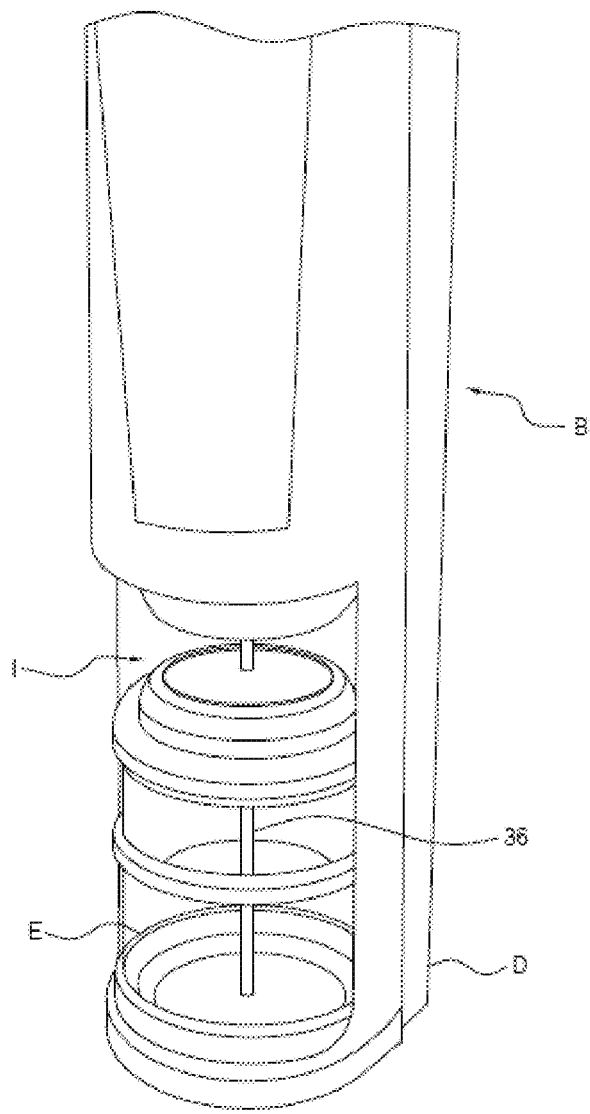
FIG. 1A is a fragmentary perspective view of the liquid dispenser depicted in FIG. 1 with the lower front panel/portion slid upwardly to reveal the replaceable five (5) gallon water bottle.
Figure 2:
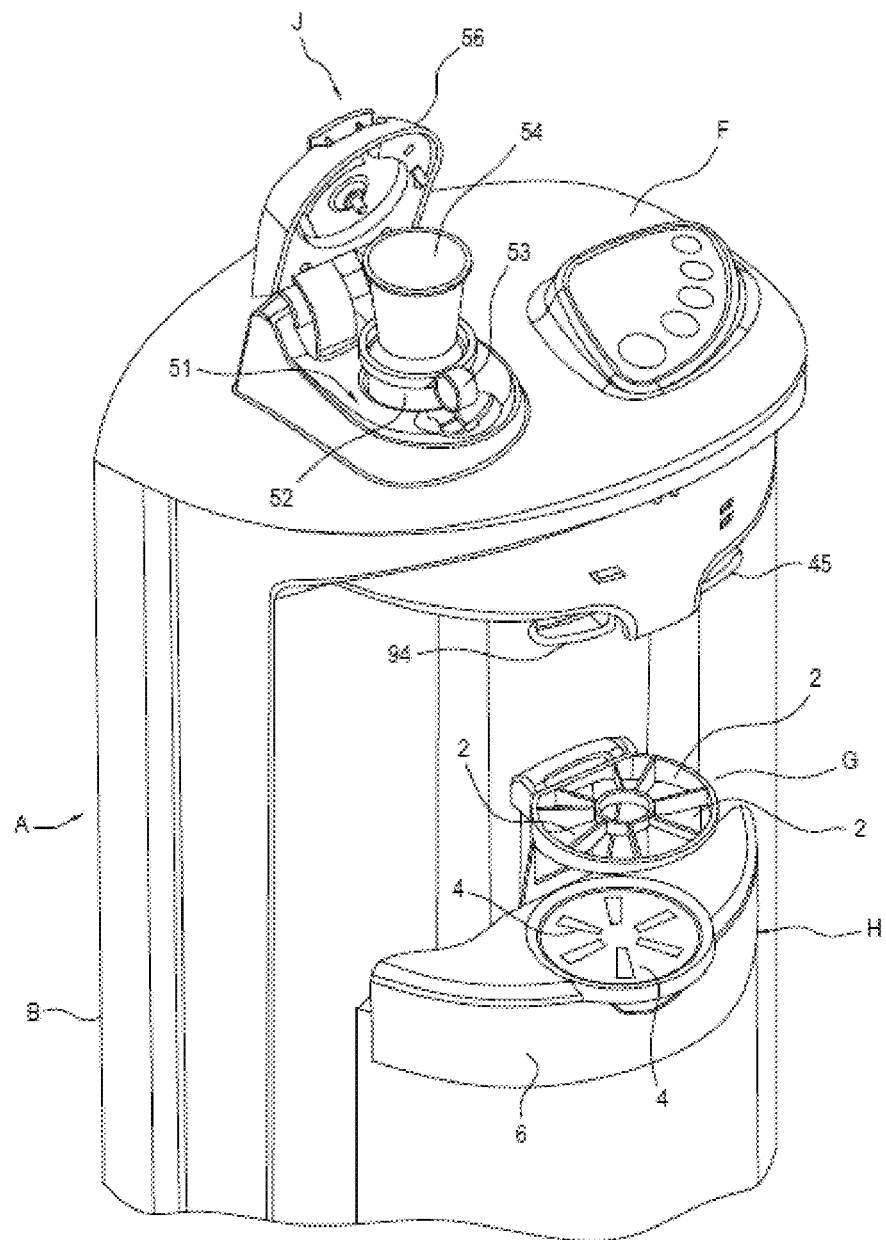
FIG. 2 is an enlarged and fragmentary perspective view of the liquid dispenser depicted in FIG. 1 with the cover of the removable flavored beverage assembly in the open position.

Referring to, for example, FIGS. 1 and 2, an upper/secondary cup support member G is detachably and/or pivotally connected to a front face of an exterior of main housing B above a lower/primary cup support member and drain/drip tray H. A plurality of flanges/lips/pockets may be formed in the front face of the exterior surface of main housing B one above the other to provide multiple optional height locations for cup support member G. Similarly, cup support member G preferably has a complimentary structure for mating with the flanges/lips/pockets formed in front face of the exterior of main housing B. Cup support member G may be pivotally or otherwise connected to the front face of the exterior of main housing B so that cup support member G may be moved between an operating position (see, e.g., FIG. 1) and a storage position (see, e.g., FIG. 5).

Cup support member G preferably includes a plurality of uniformly spaced openings 2 to allow liquid spilled while filling a cup mounted on member G to pass through one or more openings 4 formed in cup support and drain H and be collected in the hollow internal cavity formed in body 6 of cup support and drain H. Similarly, liquid spillage while a cup is mounted on the upper surface of cup support and drain H will be directed through openings 4 and collected in the hollow internal cavity formed in body 6. Body 6 may be removable from main housing B to allow liquid collected in the internal hollow cavity to be emptied. Alternatively, body 6 may have a drain allowing liquid collected in body 6 to be emptied.

The liquid dispenser A further preferably includes a water dispensing assembly I and a flavored beverage dispensing assembly J operably connected to the liquid storage container E as discussed in greater detail below. Water dispensing assembly I and flavored beverage dispensing assembly J are preferably independently removable from main housing B so that either or both dispensing assemblies can be replaced or removed and sanitized or otherwise cleaned.

Water dispensing assembly I may take the form of any of the liquid transport assemblies disclosed in U.S. Pat. Nos. 8,887,955 and/or 9,527,714. However, water dispensing assembly I may take many other forms including but not limited to a non-removable water dispensing assembly.

Referring to, for example, FIGS. 14, 15 and 17 to 20, removable water dispensing assembly I preferably includes a removable liquid transport/manifold assembly 7. The removable liquid transport/manifold assembly 7 includes a substantially rigid conduit housing 8 removably connected to a substantially rigid liquid manifold 10 in the manner disclosed in U.S. Pat. Nos. 8,887,955 and/or 9,527,714, the entire contents of which are incorporated herein by reference. Conduit housing 8 and manifold 10 may be formed out of any suitable material including plastic. Any suitable fasteners may be used to removably secure conduit housing 8 to liquid manifold 10. Further, it will be readily appreciated that conduit housing 8 may be permanently fixed to liquid manifold 10 or may be formed as one piece with liquid manifold 10.

Conduit housing 8 preferably houses a cold water dispense/pinch tube 12 and a dispensing nozzle 14. In the most preferred form, pinch tube 12 and the dispensing nozzle 14 are formed from a single piece of silicon rubber. However, the pinch tube 12 and the dispensing nozzle 14 could be formed from separate pieces that are connected in a fluid tight manner.

Referring to, for example, FIGS. 14 to 20, liquid manifold 10 includes lower chambers 16 and 17, an upper chamber 18 and a small vent hole 20. Liquid manifold 10 further includes an internally threaded collar 22 and a secondary dispensing port 24. Preferably, lower chamber 16 is smaller than lower chamber 17 as seen in, for example, FIG. 19.

Figure 20:
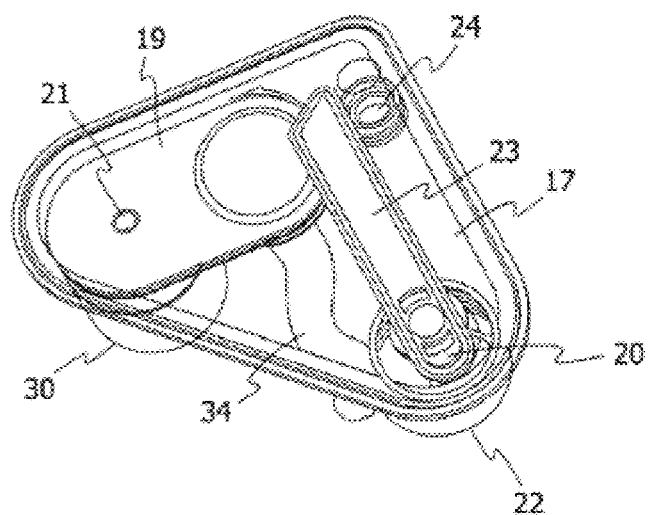

As seen in, for example, FIG. 20, cover plate 19 separates lower chamber 16 and lower chamber 17. Opening 21 formed in cover plate 19 allows liquid to pass from lower chamber 16 to lower chamber 17. Lower chamber 17 and upper chamber 18 share wall portion 23. Further, wall portion 23 forms the lowermost portion of upper chamber 18.

Figure 16:
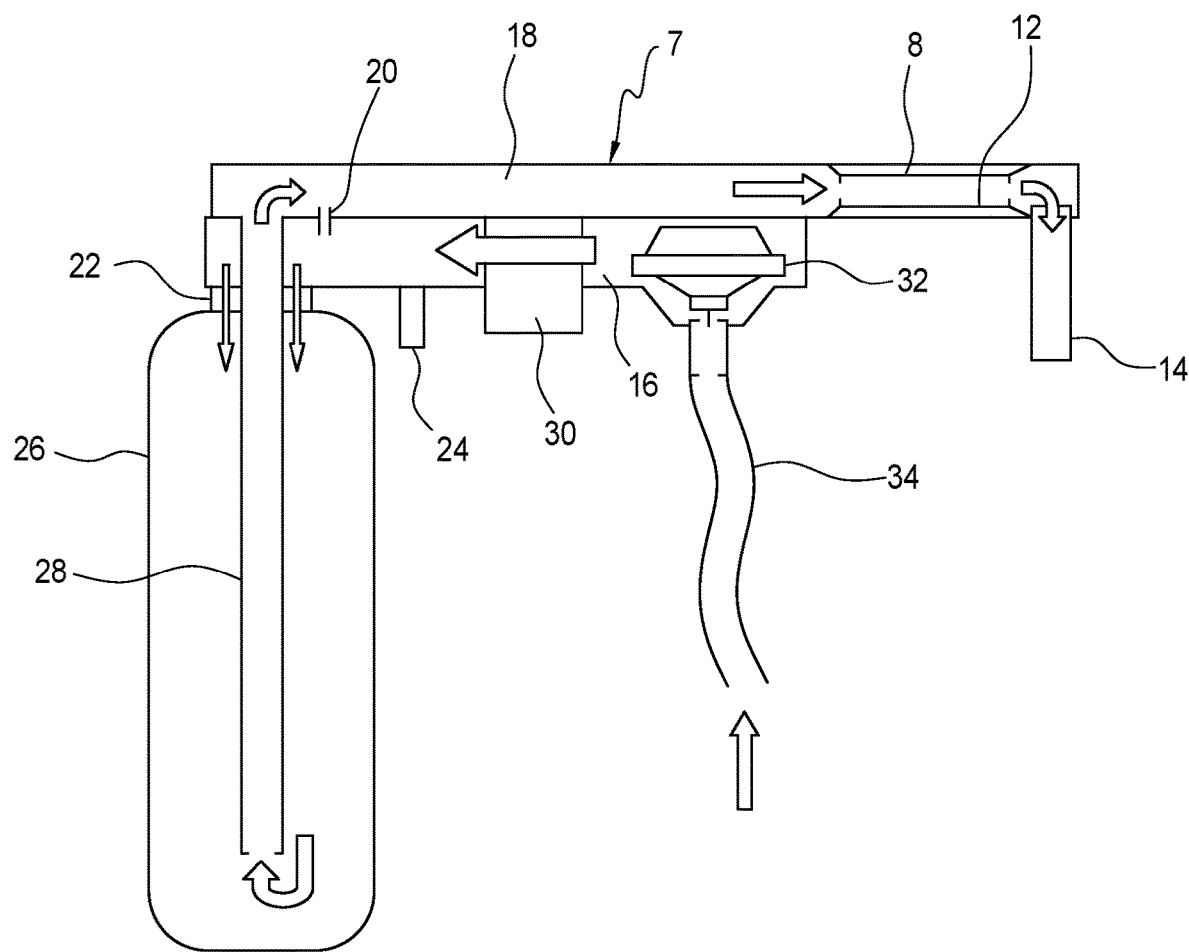
FIG. 16 is an enlarged, fragmentary cross-sectional view of one of many forms of removable water dispensing assembly.

As seen in, for example, FIG. 16, removable liquid transport/manifold assembly 7 further includes a reservoir 26 having a neck portion with external threads corresponding to the internal threads of collar 22 so that the reservoir 26 can be readily connected to and detached from liquid manifold 10.

Reservoir 26 is preferably removably seated in a reservoir housing mounted in main housing B. The reservoir housing is preferably connected to or formed integral with a chilling or cooling element to chill or cool water in reservoir 26 to any desired temperature. The reservoir housing and cooling element may take the form disclosed in U.S. Pat. Nos. 8,887,955 and/or 9,527,714 or may take any other suitable form. It will be readily appreciated that reservoir 26 may be connected to liquid manifold 10 in numerous ways other than the threaded connection described above.

Figure 17:
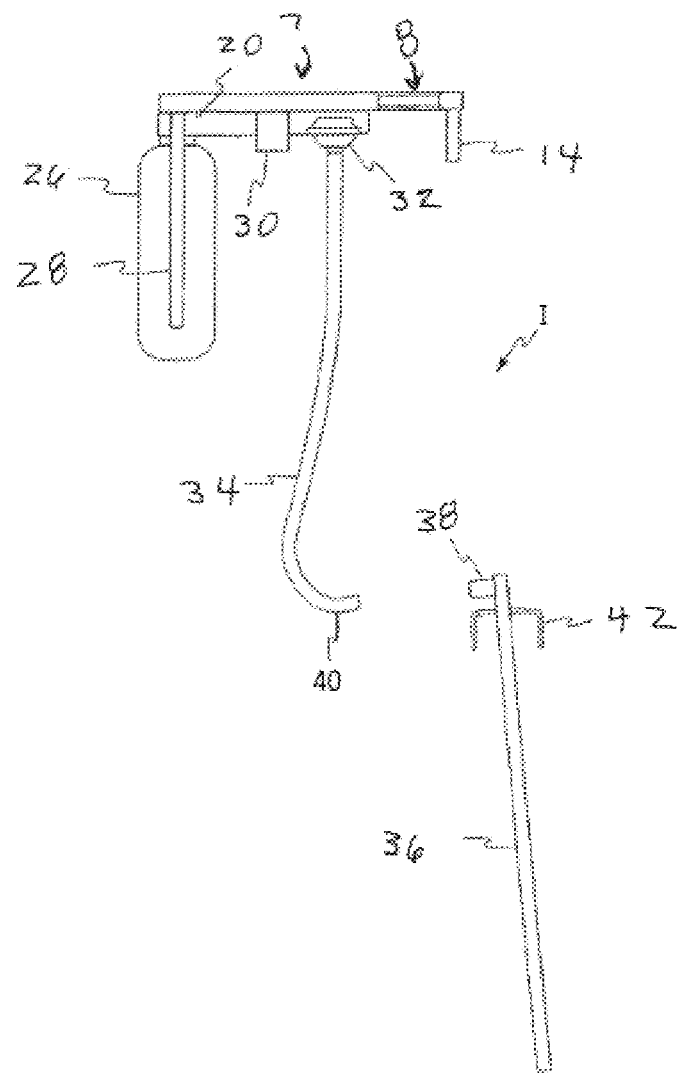
FIG. 17 is a cross-sectional view of removable water dispensing assembly and associated components for connecting the water dispensing assembly to the removable and replaceable water storage container.
Figure 18:
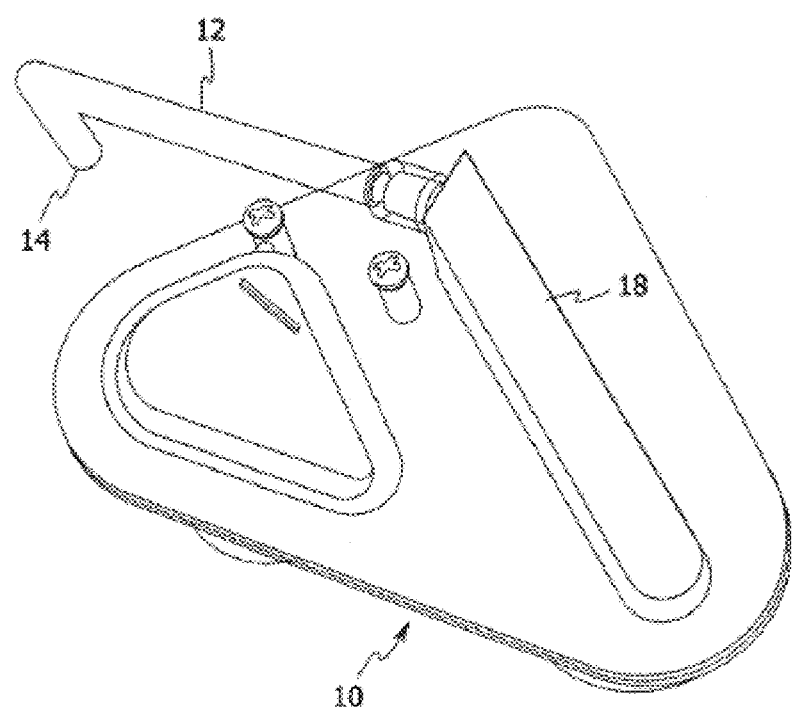
FIGS. 18 to 20 are perspective views of one of many forms of water manifold for the removable water dispensing assembly.
Figure 19:
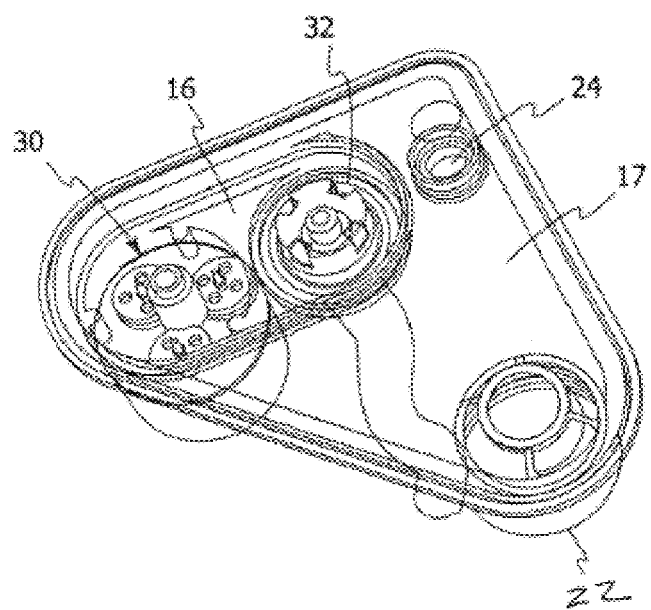

As seen in, for example, FIG. 17, removable water dispensing assembly I further preferably includes a reservoir dip tube 28, a pump head 30, a valve assembly 32, a riser tube 34 and a liquid storage container dip tube 36 having a connecting member 38 for removably connecting the liquid storage container dip tube 36 to the lower end 40 of riser tube 34. As shown in, for example, FIG. 1A, the liquid storage container dip tube 36 extends into liquid storage container E through cap 42 of container E. Pump head 30 and valve assembly 32 may take any of the forms disclosed in U.S. Pat. Nos. 8,887,955 and/or 9,527,714 or may take any other suitable form. Pump head 30 may be detachably connected to suction pump 41 housed in main housing B.

Figure 8:
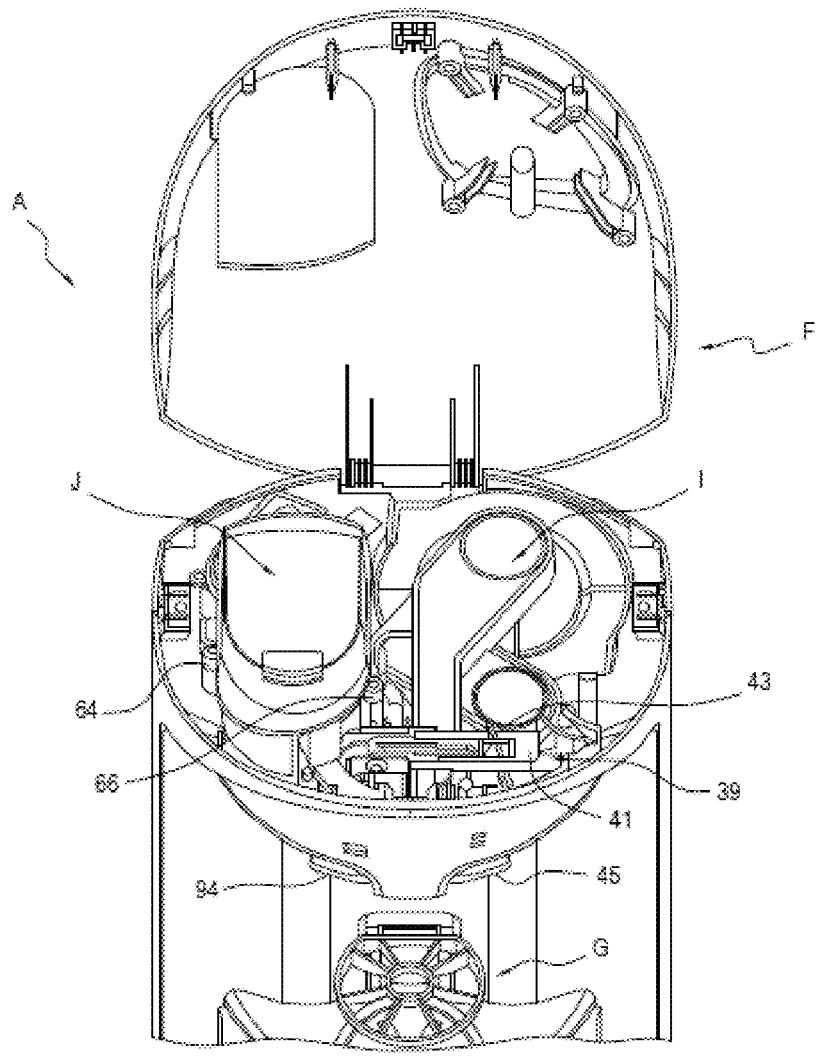
FIG. 8 is an enlarged and fragmentary perspective view of the liquid dispenser depicted in FIG. 1 with the cover of the liquid dispenser in the open position and the locking members for the flavored beverage dispensing assembly in a locked position.
Figure 9:
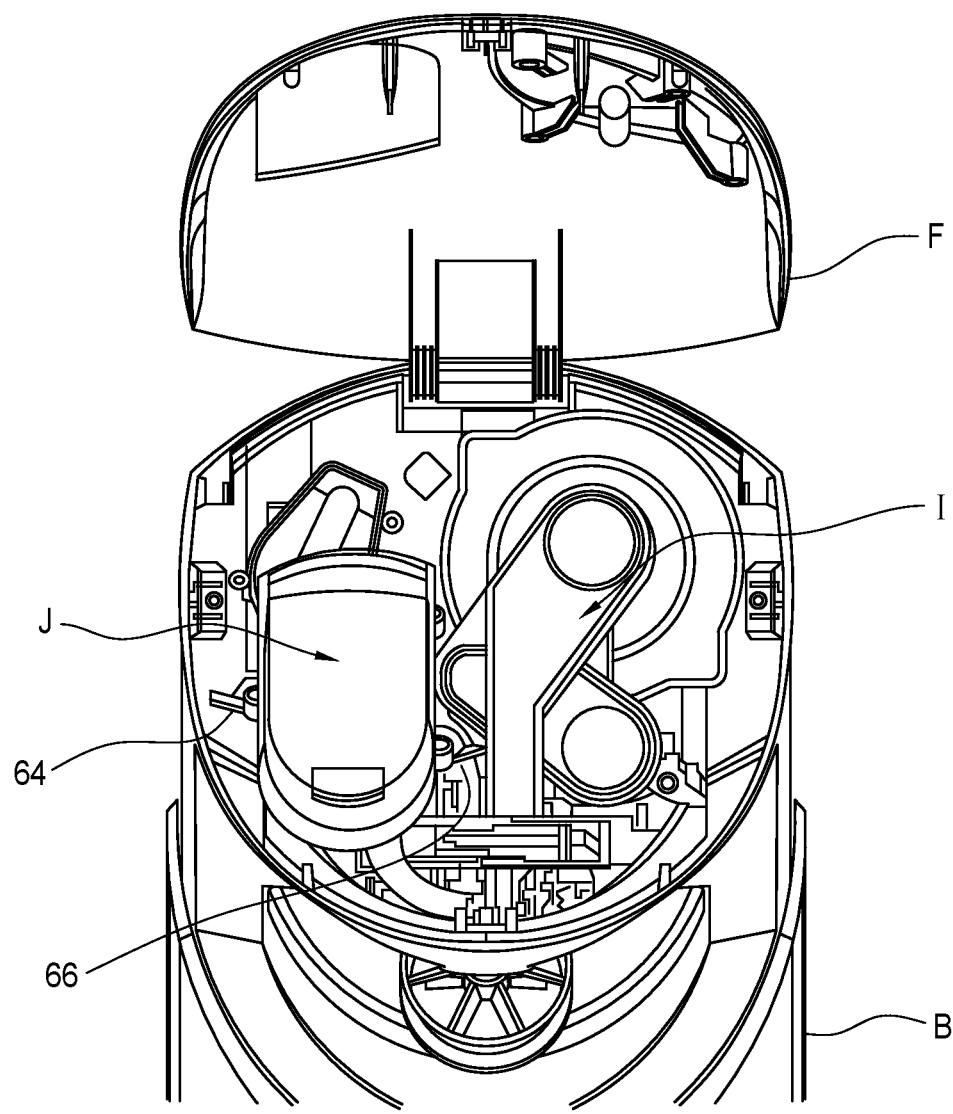
FIG. 9 is an enlarged and fragmentary perspective view of the liquid dispenser depicted in FIG. 1 with the cover of the liquid dispenser in the open position and the locking members for the flavored beverage dispensing assembly in an un-locked position.
Figure 10:
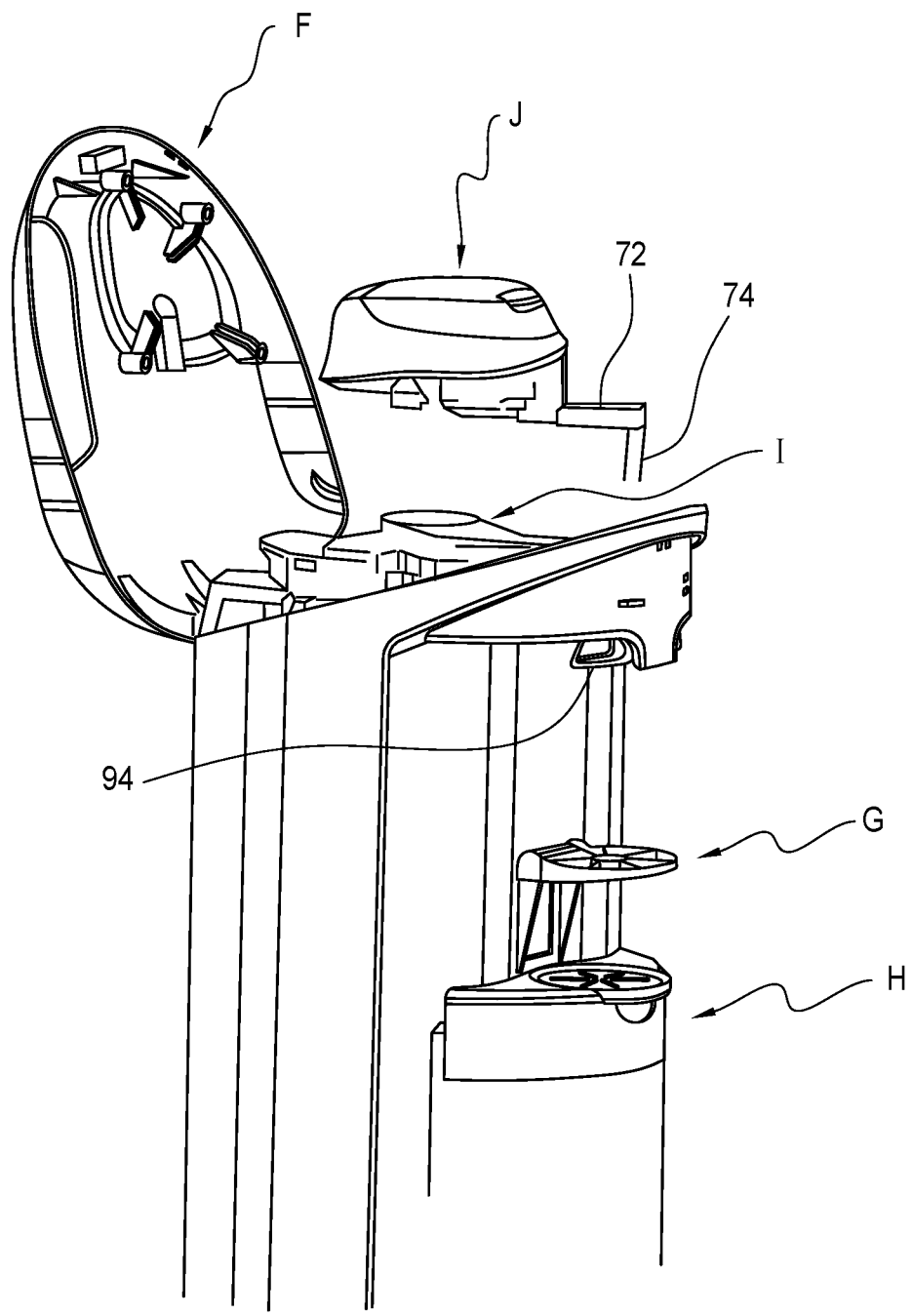
FIG. 10 is an enlarged and fragmentary perspective view of the liquid dispenser depicted in FIG. 1 with the cover of the liquid dispenser in the open position and the flavored beverage dispensing assembly removed from the liquid dispenser.

When cover F is in the open position (see, e.g., FIG. 6), and riser tube 34 is disconnected from connecting member 38 of dip tube 36, all components shown in FIG. 17 other than the dip tube 36, connecting member 38 and cap 42 can be readily removed from main housing B. Alternatively, once cap 42 is disconnected from the liquid storage container E all components shown in FIG. 17 can be readily removed from main housing B. As seen in, for example, FIG. 8, a locking member 39 may be provided which includes a horizontally extending pivotal member 41 and a vertically extending latch member 43 detachably connected to member 41 and biased in a locking position to prevent removal of water dispensing assembly I. Once latch member 43 is moved to the right (as seen in FIG. 8) by a sufficient force to overcome the spring bias, member 41 can pivot and move upwardly and to the left to allow removal of various components of water dispensing assembly I as described above.

Figure 14:
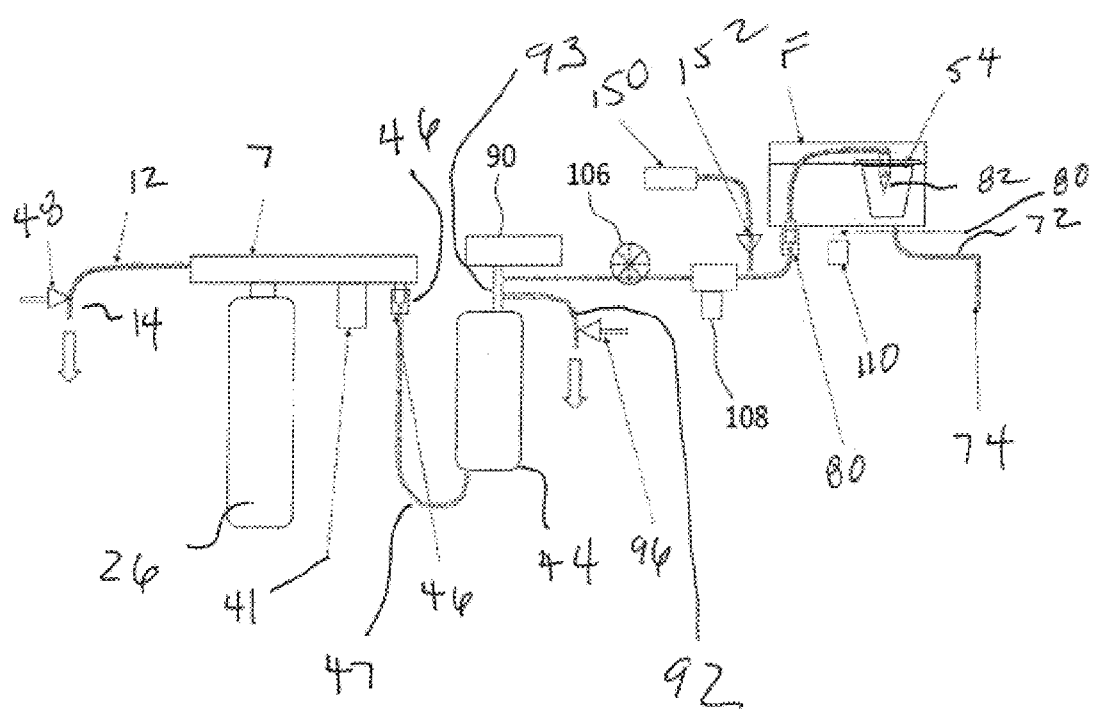
FIG. 14 is a schematic view of a preferred form of the present invention.
Figure 15:
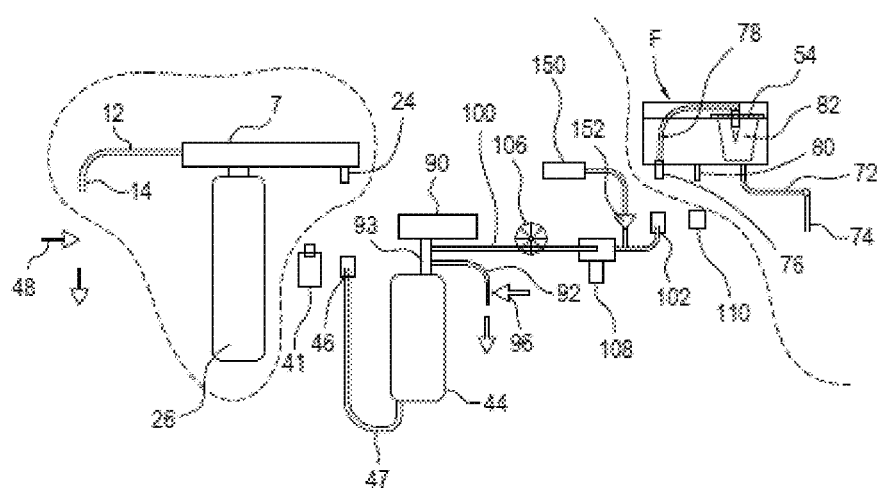
FIG. 15 is another schematic view of a preferred form of the present invention with dashed lines indicating the components that can be readily removed from the main housing of the liquid dispenser.

As seen in, for example, FIGS. 14 and 15, secondary dispensing port 24 is preferably connected to a hot water reservoir 44 by way of hot feed connector 46 and conduit 47. Hot feed connector 46 is configured to releasably connect port 24 to conduit 47 so that water dispensing assembly I can be readily removed from main housing B. For example, once any locking member 39 is released, water dispenser assembly I may be raised by an individual to a point where hot feed connector 46 is accessible to an individual to allow the individual to detach connector 46 and/or conduit 47 from water dispensing assembly I to permit removal of water dispensing assembly I from main housing B. Alternatively, dispenser A may be configured such that when cover F is in the open position, the individual can access connector 46 and/or the end of conduit 47 connected to reservoir 44 so that water dispensing assembly I can be removed. Further, dispenser A may be configured such that when cover F is in the open position and any locking member 39 is moved to an unlocked position and member 7 is raised by an individual, port 24 detaches from connector 46 by the lifting force exerted on water dispensing assembly I.

Hot water reservoir 44 is associated with a heating element for heating water stored in reservoir 44. For example, reservoir 44 may be housed in a support member operably associated/connected to any suitable heating element. Alternatively, the heating element may be disposed in reservoir 44.

Cold water dispensing lever 45 controls the flow of chilled water from reservoir 26 through dispensing nozzle 14 to dispense cold water from dispenser A. Referring to FIG. 14, a pinch valve 48 is operably associated with cold water tap lever 45 to control the flow of chilled water out dispensing nozzle 14. Specifically, pinch valve 48 acts on pinch tube 12 in a well-known manner to prevent the flow of chilled water out dispensing nozzle 14 until such time as lever 45 is depressed. A spring may bias lever 45 upwardly causing pinch valve 48 to close off pinch tube 12.

Once the biasing force of the spring is overcome by a person depressing lever 45, a micro switch activates self-priming suction pump 41 stored in main housing B and detachably connected to pump head 30 to pump water from container E upwardly through dip tube 36 and riser tube 34. The liquid travels through valve assembly 32 and pump head 30 and passes into lower chamber 17 through opening 21. Liquid flowing through chamber 17 empties into reservoir 26 (which chills the water stored therein) which in turn causes chilled water stored in reservoir 26 to pass upwardly through dip tube 28 into upper chamber 18 and out dispensing nozzle 14. Pump head 30, valve assembly 32 and the suction pump 41 may take the form disclosed in U.S. Pat. Nos. 8,887,955 and/or 9,527,714 or any other suitable form.

A preferred form of removable flavored beverage dispensing assembly J will now be described with references to FIGS. 1 to 15. As seen in, for example, FIGS. 2, 10 and 13, flavored beverage dispensing assembly J includes a housing 50 having an internal cavity 51 for receiving and storing an optional pod receiving member 52 and a single-serving flavored beverage pod 54 removably seated in pod receiving member 52. Pod receiving member 52 can be omitted by merely configuring an inner portion of housing 50 to directly receive a flavored beverage pod 54. The single-serving flavored beverage pod 54 includes contents which when mixed with water create a flavored beverage. For example, flavored beverage pod 54 may include coffee forming contents (e.g., coffee grounds), which create coffee when mixed with water. While pod 54 has been described as a single-serving flavored beverage pod, pod 54 could dispense two or more servings. The contents of pod 54 may be readily varied to dispense any suitable flavored beverage suitable for human consumption when mixed with water.

Preferably, pod receiving member 52 is removable from housing 50 and includes a finger receptacle 53 sized to receive an individual's finger to allow the individual to readily remove receptacle 53 from housing 50 simply by lifting receptacle 53. Housing 50 preferably includes a cover 56 pivotally connected to a rear or back portion of housing 50 to allow cover 56 to pivot between an open position shown in, for example, FIGS. 2 and 13, and a closed position show in, for example, FIG. 1. It should be noted that cover 56 may be releasably connected to the body of the housing 50 in any other suitable manner.

Any suitable locking or latch mechanism 57 may be used to releasably connect cover 56 to the body of housing 50. Alternatively, flavored beverage dispensing assembly J can be formed without a cover that can be opened and closed. In this scenario, flavored beverage dispensing assembly J can be removed and replaced with each serving or servings of a flavored beverage.

Referring to FIGS. 6 to 9, 11 and 13, housing 50 includes arcuate shaped recessed locking portions 60 and 62 formed in the exterior of housing 50 for receiving locking or latch members 64 and 66, respectively. Locking or latch members 64 and 66 can take the form of turn-button type latches or locks that rotate about a vertically extending member/pin between a non-locking or non-latching position (see, e.g., FIG. 9) to a locking or latching position (see, e.g., FIG. 8). Locking portions 60 and 62 each include an arcuate shaped and inwardly extending cavity 68 and bottom wall portion 70. The arcuate cavity 68 receives a complimentary shaped end portion of the corresponding members 64 and 66. Bottom wall portion 70 prevents upward movement of dispensing assembly J when the corresponding members 64 and 66 are in the latched or locked position.

Figure 13:
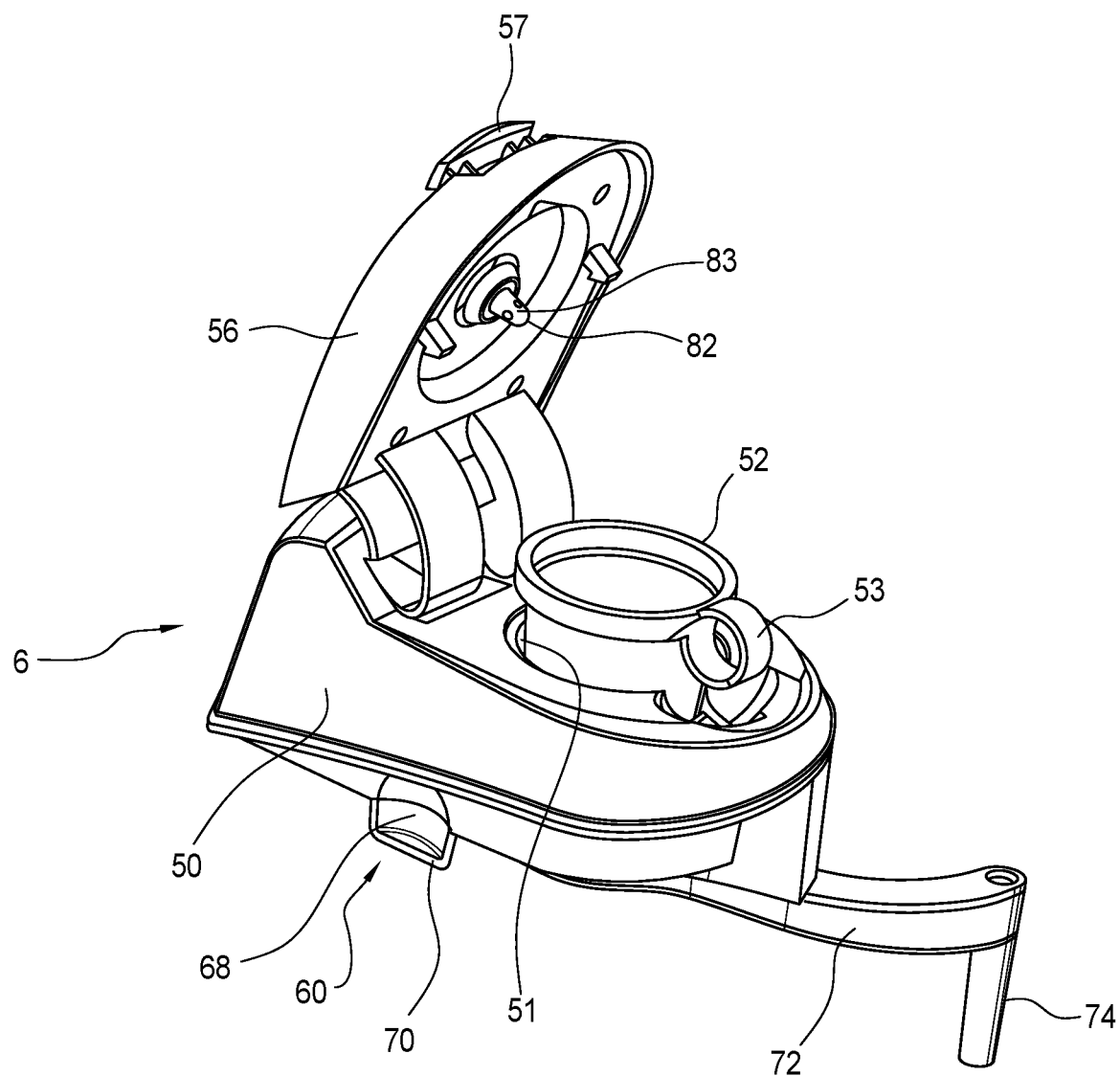
FIG. 13 is an enlarged perspective view of a preferred form of flavored beverage dispensing assembly with the cover of the flavored beverage dispensing assembly in the open position.

Dispensing assembly J includes a substantially rigid hollow arm 72 and a dispensing nozzle 74 extending downwardly from arm 72 as seen in, for example, FIG. 13. Housing 50 further includes a hot water inlet port 76, a water conduit 78 and a lid switch actuator 80. Cover 56 includes a pod piercing member 82 having a plurality of openings 83 preferably formed in an exterior surface of member 82. Water conduit 78 is connected to pod piercing member 82.

When cover 56 is closed and a pod 52 is in housing 50, member 82 pierces the upper surface of pod 54 and openings 83 in member 82 are disposed in pod 54 so that water delivered to and passing through conduit 78 is delivered directly into pod 54. Housing 50 is configured to allow liquid to pass through pod 54 into a lower portion of internal cavity 51 of housing 50. Internal cavity 51 is connected to arm 72 so that a flavored beverage created by water passing through pod 54 passes into the hollow cavity of arm 72 and out dispensing nozzle 74.

Referring to FIGS. 14 and 15, liquid dispenser A further includes a steam release valve 90 operably connected to reservoir 44 to release steam from reservoir 44 as may be necessary. Valve 90 can be manually or automatically activated.

Figure 11:
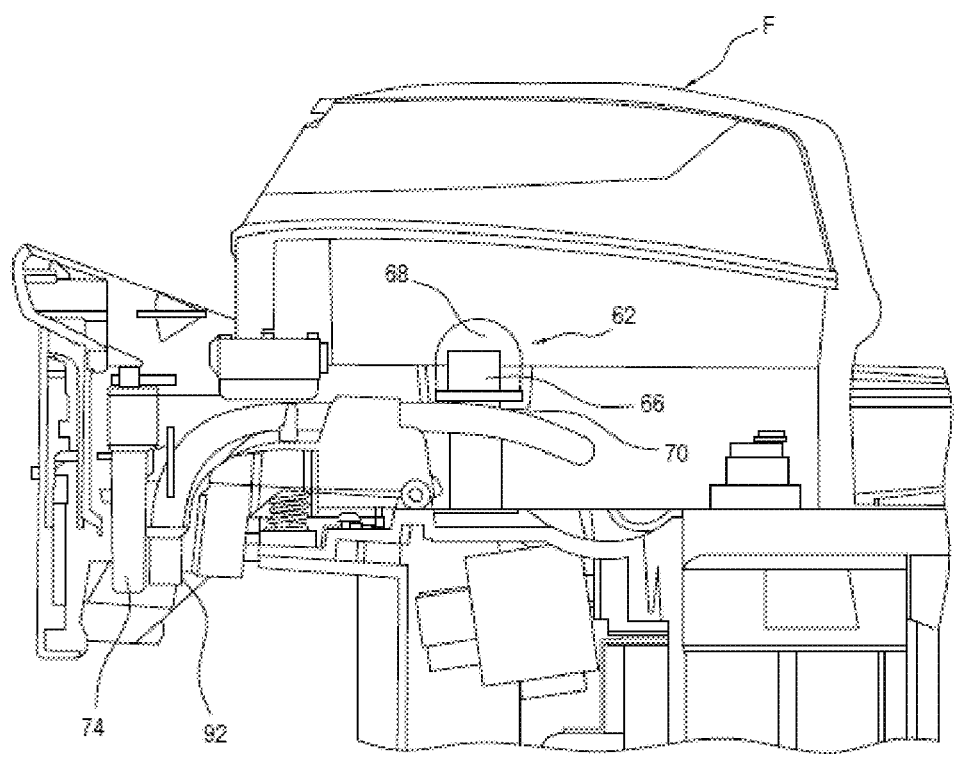
FIG. 11 is an enlarged and fragmentary perspective view of the liquid dispenser depicted in FIG. 1 with portions thereof removed so various internal components are more readily visible.
Figure 12:
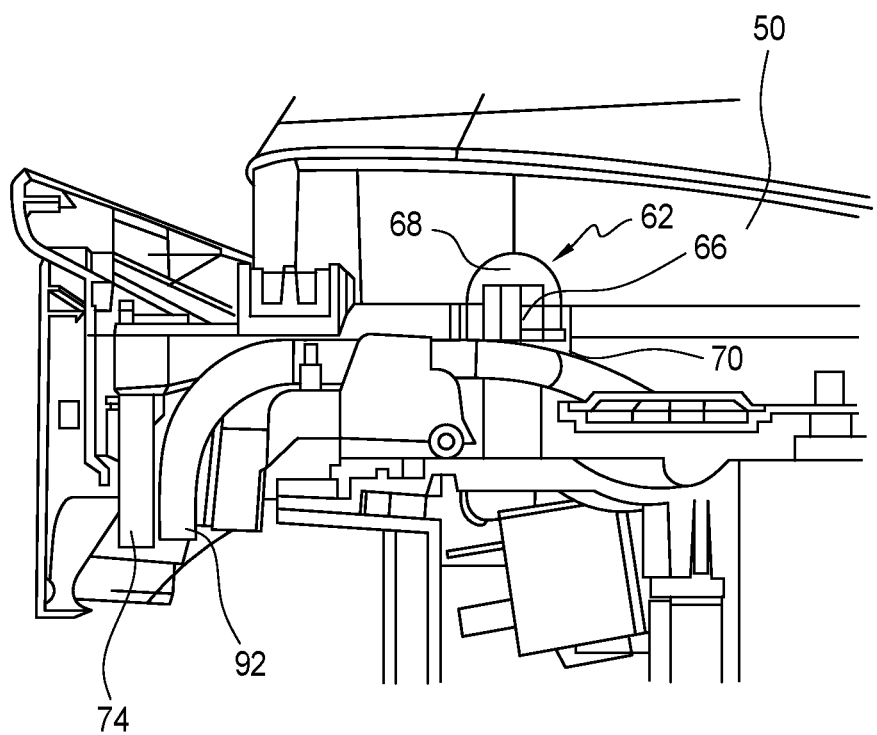
FIG. 12 is an enlarged and fragmentary perspective view similar to FIG. 11.

Reservoir 44 is connected to a hot water dispense conduit 92 as shown in, for example, FIGS. 11, 14 and 15 via conduit 93 to dispense hot water from dispenser A without passing through flavored beverage dispensing assembly J. A lower end of conduit 93 preferably terminates in an upper portion of reservoir 44 so that hot or heated water is delivered to hot water dispense conduit 92.

Hot water tap lever 94 controls the flow of hot water from reservoir 44 through dispensing conduit 92. A secondary or safety control (e.g., safety button) may be operably connected to lever 94 to prevent hot water from being dispensed even when lever 94 has been activated, i.e., hot water is only dispensed when the safety button and lever 94 are both activated. Referring to FIGS. 14 and 15, a pinch valve 96 is operably associated with hot water tap lever 94 to control the flow of hot or heated water out dispensing conduit 92. Specifically, pinch valve 96 acts on conduit 92 in a well-known manner to prevent the flow of hot or heated water out dispensing conduit 92 until such time as lever 94 is depressed. A spring may bias lever 94 upwardly causing pinch valve 96 to close off conduit 92. Once the biasing force of the spring is overcome by a person depressing lever 94 and any existing safety button is triggered or activated, a micro switch activates self-priming suction pump 41 to direct water out secondary port 24. Water travels through conduit 46 and enters hot water reservoir 44 thereby forcing heated water out of reservoir 44 into conduit 93 and out dispensing conduit 92. While pinch valves are described above to control the flow of water from the hot and cold water dispensing conduits/nozzles, any other suitable control mechanism may be used to control the flow of hot water and cold water from liquid dispenser A.

Conduit 100 is connected at one end to tube 93 and at the other end to flavored beverage feed connector 102 which in turn is connected to the water inlet port 76 extending downwardly from a lower surface of housing 50. Preferably, flavored beverage feed connector 102 includes a shut-off valve so that once flavored beverage feed connector 102 is disconnected from water inlet port 76 water cannot flow out conduit 100. A flow measuring unit/device 106 is connected to conduit 100 to measure the flow of water through conduit 100. A solenoid valve 108 is connected to conduit 100 to control the flow of hot water to inlet port 76. A switch 110 detects when cover 56 is in a closed position.

Figure 3:
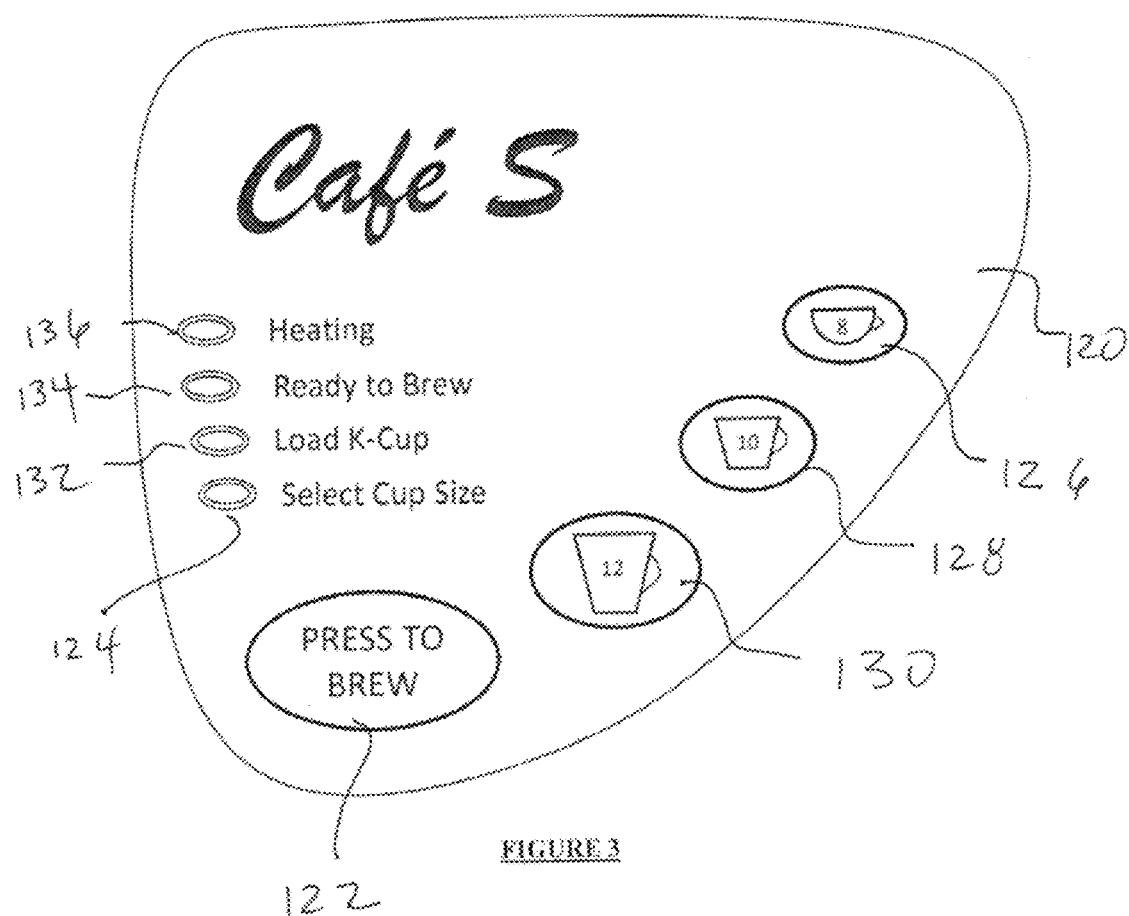
FIG. 3 is an enlarged view of the control panel of the liquid dispenser depicted in FIG. 1.
Figure 4:
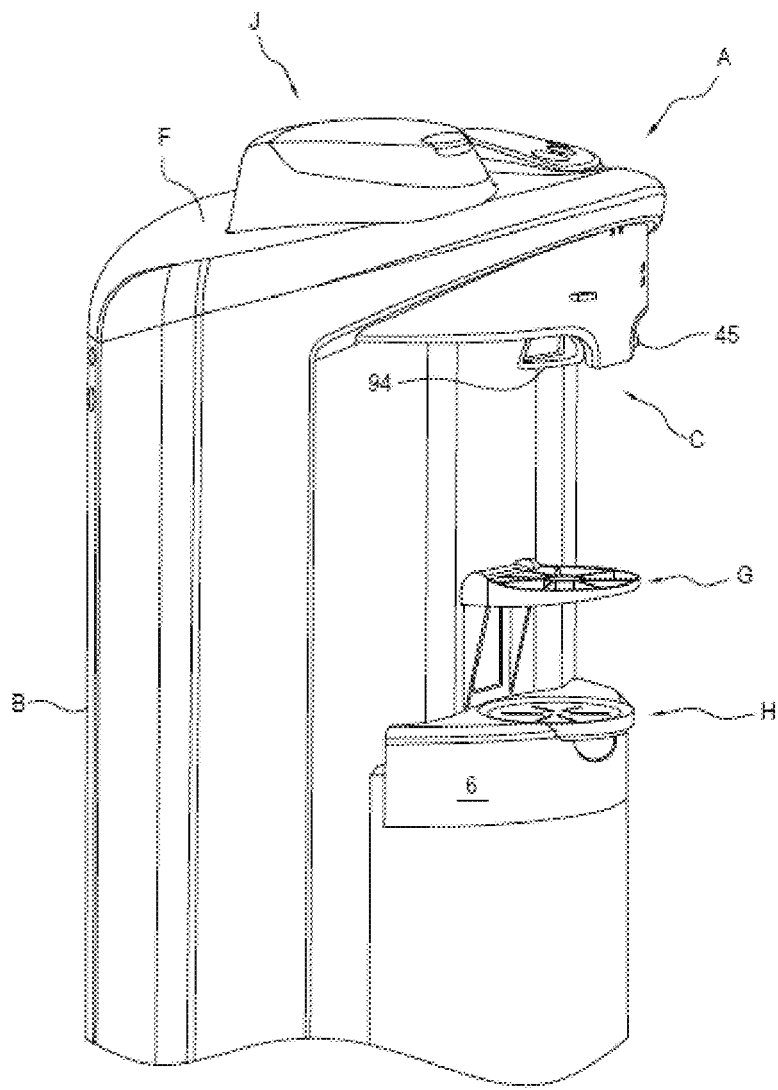
FIG. 4 is an enlarged and fragmentary perspective view of the liquid dispenser depicted in FIG. 1 with the cover of the removable flavored beverage assembly in the closed position.
Figure 5:
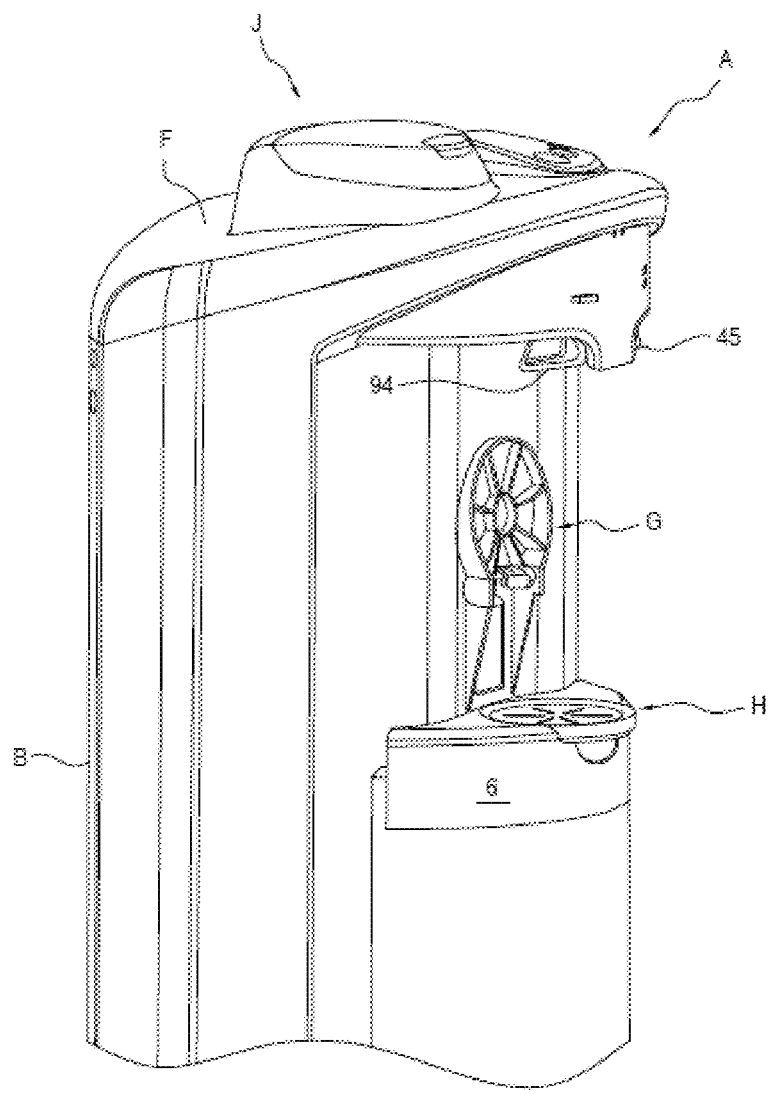
FIG. 5 is an enlarged and fragmentary perspective view of the liquid dispenser depicted in FIG. 4 with the secondary cup support shown in a storage position.
Figure 6:
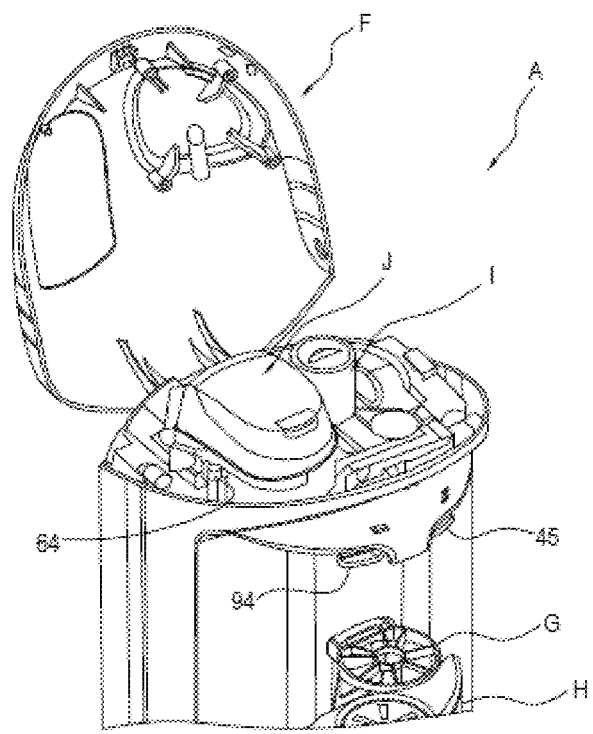
FIG. 6 is an enlarged and fragmentary perspective view of the liquid dispenser depicted in FIG. 1 with the cover of the liquid dispenser in the open position.
Figure 7:
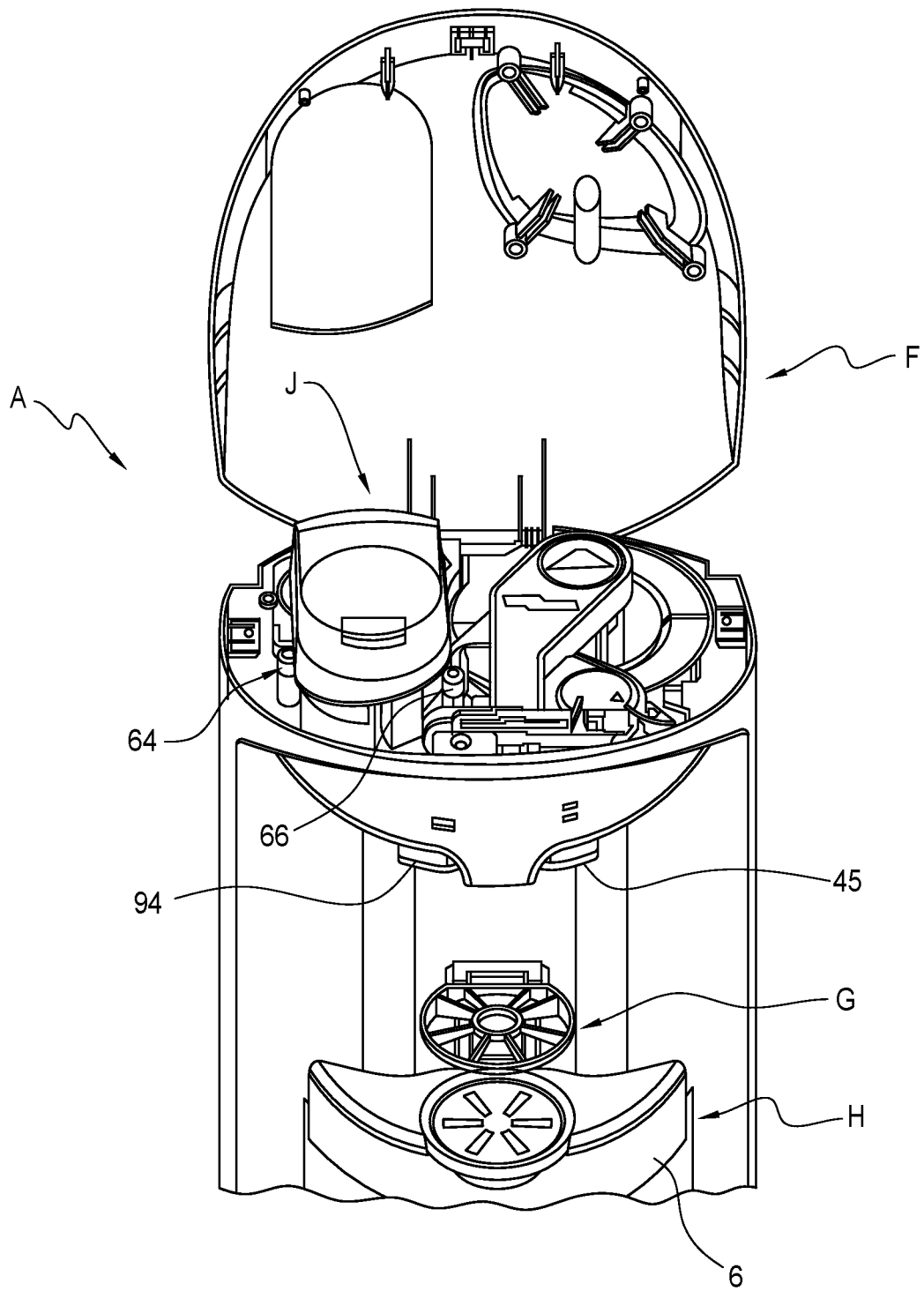
FIG. 7 is an enlarged and fragmentary perspective view of the liquid dispenser depicted in FIG. 1 with the cover of the liquid dispenser in the open position taken from a different vantage point.

Liquid dispenser A includes a control panel 120 as shown in, for example, FIG. 3 for activating the flavored beverage dispensing assembly J to dispense a flavored beverage from liquid dispenser A.

The separation of flavored beverage dispensing assembly J and the flavored beverage feed connector 102 (e.g., when cover 56 is opened and the flavored beverage dispensing assembly J is removed from housing 50) causes the shut-off valve of the flavored beverage feed connector 102 to close. The shut-off valve in the flavored beverage feed connector 102 is optional as it is a redundant shut-off mechanism. Specifically, when cover 56 is open, the control system is preferably configured to close solenoid valve 108 to prevent water from flowing to flavored beverage dispensing assembly J. Removal of flavored beverage dispensing assembly J will have the same affect.

Indicator light 136 will flash if the water is not heated to a suitable temperature for dispensing a flavored beverage. Typically, there is sufficient hot water in reservoir 44 as the control system is preferably configured to periodically refill reservoir 44. However, if a user or users have operated the dispenser such that successive hot water dispense conditions have occurred (e.g., multiple hot water only dispenses or multiple hot flavored beverage dispenses or a combination thereof) in a short period, it may be necessary to heat the water (continuously replenished by the system) in the reservoir 44 before a subsequent hot water dispense can occur be it hot water dispense only or a hot flavored beverage dispense. When the water is at a suitable temperature for dispensing a flavored beverage, indicator lights 132 and 134 will be illuminated to inform the user that the dispenser is ready to brew and a flavored beverage pod needs to be loaded.

When cover 56 is closed (e.g., as would occur once a user has loaded a flavored beverage pod and closed cover 56 in response to the illumination of indicator lights 132 and 134), the indicator light 124 is lit to signal to the user to select a cup size from among an 8 oz. activation member 126, a 10 oz. activation member 128 and a 12 oz. activation member 130 so that a flavored beverage of the selected quantity is dispensed from liquid dispenser A. It is to be noted that the size or quantity of flavored beverage dispensed from dispenser A may be readily varied as desired. The select cup size feature is time sensitive, i.e., if one of the activation members 126, 128 and 130 are not selected within a predetermined time period from the initial illumination of indicator light 124 (e.g., ten seconds) the brewing process resets/stops and the system waits for a subsequent occurrence of cover 56 being closed before the brewing process is restarted. After initial activation of one of the activation members 126, 128 and 130, a user can activate another of activation members 126, 128 and 130 to change the quantity of the flavored beverage dispensed from the user's prior or initial selection provided that the subsequent activation occurs within ten seconds or other predetermined time period of the immediately previous selection (i.e., timing out of the system occurs after a predetermined period of inactivity).

Upon activation of one of activations members 126, 128 and 130, brewer activation member 122 illuminates to signal to the user to activate this member to dispense the selected quantity of flavored beverage. Once the member 122 is activated, the selected quantity of flavored beverage is dispensed. Flow meter 106 ensures that the quantity of hot water conveyed to assembly J corresponds to the serving size selected by the user using activation members 126, 128 and 130. Activation of member 122 is also time sensitive, i.e., if member 122 is not activated within a predetermined time period from the most recent cup size selection (e.g., ten seconds) the brewing process resets/stops and the system waits for a subsequent occurrence of cover 56 being closed before the brewing process is restarted. If the brewing process times out either due to the user not timely selecting one of activation members 126, 128 and 130 or not timely activating member 122, the user need only open and reclose cover 56 to restart the brewing process. During brewing, if the press to brew button 122 is activated for a prolonged period (e.g., five seconds) the brewing process is terminated and will not recommence until cover 56 is opened and closed.

Pump 41 that conveys water from the five (5) gallon water bottle to the cold water and hot water dispensing conduits/nozzles is preferably operated at 12 volts. The same pump 41 pumps water to the flavored beverage dispensing assembly J and water dispensing assembly I. Specifically, during the flavored beverage dispensing process, pump 41 pumps water into liquid manifold 10 and out discharge port 24 and then into reservoir 44. When lever 94 is not activated, which is the case when dispensing a flavored beverage, hot water exits reservoir 44 and travels into conduit 100 and into conduit 78. Hot water travels through piercing member 82 and into pod 54 and ultimately out nozzle 74. As it will be readily appreciated, solenoid valve 108 and the shut-off valve in connector 102 must be open for hot water to travel in the manner just described.

However, when pump 41 (e.g., a 12 volt pump or any other suitable voltage pump) is operated at a maximum pump output continuously (i.e., without interruption of any kind) for the time period necessary for dispensing a hot flavored beverage, the pressure of the water supplied to flavored beverage dispensing assembly J will likely be too high causing spillage of hot water or other undesirable consequences. The pressure of water supplied by pump 41 to flavored beverage dispensing assembly J is preferably reduced to an acceptable level by using electronic pulse width modulation at a very high frequency in combination with cycling the pump 41 between an on cycle and an off cycle. In the on cycle, the transistor switch is on and full power is supplied to pump 41. In the off cycle, the transistor switch is off and pump 41 is off as no power is supplied to pump 41. In a most preferred form, the on cycle is two seconds and the off cycle is three seconds. However, these time periods can be readily varied as desired. The on-off cycling reduces the pressure of the water supplied by pump 41 to flavored beverage dispensing assembly J from that of the pressure of water supplied by pump 41 during the cold and hot water dispensing cycles resulting from activation of levers 45 and 94.

Electronic pulse width modulation is used during the on cycle in which the transistor switch activating pump 41 remains on for the entire duration of the on cycle to further lower the pressure of water supplied by pump 41 to flavored beverage dispensing assembly J. More specifically, electronic pulse width modulation causes a series of on-off pulses varying the duty cycle of the pump the fraction of time that the output voltage is on compared to when it is off while keeping the frequency constant. For example, the on pulse could be 50 milliseconds and the off pulse could be 50 milliseconds. Alternatively, the on pulse could be longer than the off pulse, for example 60 milliseconds on and 40 milliseconds off. The on-off pulsing further lowers the pressure of the water pumped by pump 41 from the pressure adjustment achieved by the on-off cycling.

A voltage reducer or other motor control can be used to achieve the necessary reduction in the pressure of water supplied to flavored beverage dispensing assembly J.

When the correct amount of water has flowed to flavored beverage dispensing assembly J as determined by flow meter 106, the pump stops and after a short delay to allow the pressure to reduce the solenoid valve 108 is closed. After the selected amount (e.g., 8 oz., 10 oz. or 12 oz) of the flavored beverage has been dispensed, air pump 150 is activated for a predetermined period (e.g., preferably a short period) to flush any residual water out of the single-serving pod and the flavored beverage dispensing assembly J to allow the user to remove the single-serving pod and/or the flavored beverage dispensing assembly J with minimal dripping upon removal of the single-serving pod and/or the flavored beverage dispensing assembly J. A one-way valve 152 prevents water from flowing back to air pump 150.

Preferably, when cover 56 is open, the solenoid valve, water pump and the air pump are closed/off/inhibited/prevented from operating to preclude water and/or air from being directed to flavored beverage dispensing assembly J.

When the flavored beverage dispensing assembly J is removed, water flowing to the flavored beverage dispensing assembly J is shut-off by the closure of solenoid valve 108 and the closure of the shut-off valve in the brewer feed connector 102 and the cover detector switch is deactivated simulating an open cover.

While flavored beverage dispensing assembly J has been shown as being connected to hot water reservoir 44 to deliver hot water to flavored beverage dispensing assembly J, it will be appreciated and within the scope of this invention that in addition to or in place of the hot water connection, flavored beverage dispensing J can be connected to liquid manifold 10 so that chilled and/or ambient temperature water is delivered to the pod 54, i.e., liquid dispenser A can be configured to dispense a hot, chilled or ambient temperature flavored beverage or any combination thereof.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A liquid dispenser for dispensing water and a flavored beverage; said liquid dispenser comprising:
    (a) a water dispensing assembly, a flavored beverage dispensing assembly and a water storage container, said liquid dispenser further including a liquid dispenser housing for storing at least a portion of the water dispensing assembly, at least a portion of the flavored beverage dispensing assembly and the water storage container;
    (b) a single water pump for pumping water from said water storage container to said water dispensing assembly and said flavored beverage assembly wherein water dispensed by said water dispensing assembly from said water storage container does not enter said flavored beverage dispensing assembly;
    (c) the water dispensing assembly includes a manifold operably connected to the water storage container and the single water pump such that when the single water pump is operating in a flavored beverage dispensing mode, the manifold is configured to direct water to a hot water reservoir wherein the hot water reservoir is configured to supply hot water to the flavored beverage dispensing assembly and when the single water pump is operating in a water dispensing mode the manifold of the water dispensing assembly is configured to direct water to a first water outlet of the liquid dispenser such that no portion of water dispensed from the liquid dispenser by the first water outlet enters the hot water reservoir prior to being dispensed from the liquid dispenser by the first water outlet; and
    (d) a control system operably connected to said single water pump to supply water to said flavored beverage dispensing assembly at a lower pressure than water discharged from said liquid dispenser by said water dispensing assembly.

2. A liquid dispenser as set forth in claim 1, wherein:
    (a) when supplying water to said flavored beverage dispensing assembly, said control system is configured to cycle said single water pump between an on cycle where said single water pump is operating and an off cycle where said single water pump is not operating; and,
    (b) during said on cycle said control system is configured to use electronic pulse width modulation to further lower the pressure of water supplied to said flavored beverage dispensing assembly.

3. A liquid dispenser as set forth in claim 2, wherein:
    (a) said on cycle is two seconds and said off cycle is three seconds.

4. A liquid dispenser as set forth in claim 3, wherein:
    (a) said water dispensing assembly is removable from said liquid dispenser housing so that said water dispensing assembly can be replaced or sanitized; and,
    (b) said flavored beverage dispensing assembly is removable from said liquid dispenser housing so that said flavored beverage dispensing assembly can be replaced or sanitized, said flavored beverage dispensing assembly includes a pod receiving member for receiving a pod for dispensing a single-serving flavored beverage.

5. A liquid dispenser as set forth in claim 4, further including:
    (a) at least one conduit for connecting said water dispensing assembly to said flavored beverage dispensing assembly so that water in said water dispensing assembly is conveyed to said flavored beverage dispensing assembly.

6. A liquid dispenser for dispensing water and a flavored beverage; said liquid dispenser comprising:
    (a) a water dispensing assembly, a flavored beverage dispensing assembly, a first water reservoir for storing water to be dispensed by the water dispensing assembly, a second water reservoir for storing hot water to be directed into the flavored beverage dispensing assembly and a water storage container, said liquid dispenser further including a liquid dispenser housing for storing at least a portion of the water dispensing assembly, at least a portion of the flavored beverage dispensing assembly and the water storage container;
    (b) a single water pump for pumping water from said water storage container to force water stored in said first water reservoir to flow out of said first water reservoir to be dispensed by said water dispensing assembly when said liquid dispenser is to dispense water and to force hot water stored in said second water reservoir to flow out of said second water reservoir and into said flavored beverage dispensing assembly when said liquid dispenser is to dispense a flavored beverage; and,
    (c) a control system operably connected to said single water pump to supply water to said flavored beverage dispensing assembly at a lower pressure than water discharged from said liquid dispenser by said water dispensing assembly wherein said water dispensing assembly dispenses water at a temperature below a temperature of a flavored beverage dispensed by said flavored beverage dispensing assembly.

7. A liquid dispenser as set forth in claim 6, wherein:
    (a) when supplying water to said flavored beverage dispensing assembly, said control system is configured to cycle said single water pump between an on cycle where said single water pump is operating and an off cycle where said single water pump is not operating; and,
    (b) during said on cycle said control system is configured to use pulse width modulation to further lower the pressure of water supplied to said flavored beverage dispensing assembly.

8. A liquid dispenser as set forth in claim 7, wherein:
    (a) said on cycle is two seconds and said off cycle is three seconds.

9. A liquid dispenser as set forth in claim 8, wherein:
    (a) said water dispensing assembly and said flavored dispensing assembly are independently removable from said liquid dispenser.

10. A liquid dispenser as set forth in claim 9, wherein:
(a) at least one conduit for connecting said water dispensing assembly to said flavored beverage dispensing assembly so that water in said water dispensing assembly is conveyed to said flavored beverage dispensing assembly.

11. A liquid dispenser for dispensing water and a flavored beverage; said liquid dispenser comprising:
(a) a water dispensing assembly, a flavored beverage dispensing assembly, a first water reservoir for storing water to be dispensed by the water dispensing assembly, a second water reservoir for storing hot water to be directed into the flavored beverage dispensing assembly and a water storage container, said liquid dispenser further including a liquid dispenser housing for storing at least a portion of the water dispensing assembly, at least a portion of the flavored beverage dispensing assembly and the water storage container, wherein said water dispensing assembly and said flavored beverage dispensing assembly are independently removable from the liquid dispenser;
(b) a single water pump for pumping water from said water storage container to force water stored in said first water reservoir to flow out of said first water reservoir to be dispensed by said water dispensing assembly when said liquid dispenser is to dispense water and to force hot water stored in said second water reservoir to flow out of said second water reservoir and into said flavored beverage assembly when said liquid dispenser is to dispense a flavored beverage; and,
(c) a control system operably connected to said single water pump to operate said single water pump in a first manner to supply water to said flavored beverage dispensing assembly and operate said single water pump in a second manner to supply water to said water dispensing assembly so that water supplied to said flavored beverage dispensing assembly is at a lower pressure than water discharged from said liquid dispenser by said water dispensing assembly wherein said first manner is different from said second manner.

12. A liquid dispenser as set forth in claim 11, wherein:
(a) said water dispensing assembly dispenses water at a temperature below a temperature of a flavored beverage dispensed by said flavored beverage dispensing assembly.

13. A liquid dispenser as set forth in claim 12, wherein:
(a) water dispensed by said water dispenser assembly is at or below an ambient temperature.

14. A liquid dispenser as set forth in claim 11, wherein:
(a) water dispensed by said water dispensing assembly does not enter said flavored beverage dispensing assembly.

15. A liquid dispenser as set forth in claim 1, wherein:
(a) said water dispensing assembly dispenses water at a temperature below a temperature of a flavored beverage dispensed by said flavored beverage dispensing assembly.

16. A liquid dispenser as set forth in claim 15, wherein:
(a) water dispensed by said water dispenser assembly is at or below an ambient temperature.

17. A liquid dispenser as set forth in claim 6, wherein:
(a) said water dispensing assembly and said flavored dispensing assembly are independently removable from said liquid dispenser.

18. A liquid dispenser as set forth in claim 6, wherein:
(a) water dispensed by said water dispensing assembly does not enter said flavored beverage dispensing assembly.

19. A liquid dispenser as set forth in claim 6, wherein:
(a) the water dispensing assembly includes a manifold operably connected to the water storage container and the single pump such that when the single pump is operating in a flavored beverage dispensing mode, the manifold is configured to direct water to the second water reservoir and when the single pump is operating in a water dispensing mode the manifold of the water dispensing assembly is configured to direct water to a first water outlet of the liquid dispenser such that no portion of water dispensed from the liquid dispenser by the first water outlet enters the second water reservoir prior to being dispensed from the liquid dispenser by the first water outlet wherein the water storage container is a water bottle stored in a bottom of the liquid dispenser housing in an upright orientation.

20. A liquid dispenser as set forth in claim 11, wherein:
(a) the water dispensing assembly includes a manifold operably connected to the water storage container and the single pump such that when the single pump is operating in a flavored beverage dispensing mode, the manifold is configured to direct water to the second water reservoir and when the single pump is operating in a water dispensing mode the manifold of the water dispensing assembly is configured to direct water to a first water outlet of the liquid dispenser such that no portion of water dispensed from the liquid dispenser by the first water outlet enters the second water reservoir prior to being dispensed from the liquid dispenser by the first water outlet wherein the water storage container is a water bottle stored in a bottom of the liquid dispenser housing in an upright orientation.

* * * * *